Sept. 2, 1958 M. B. RASMUSSON 2,850,051
AUTOMATIC FILLER FOR CONFECTION MOLDS
Filed Oct. 17, 1955 4 Sheets-Sheet 1
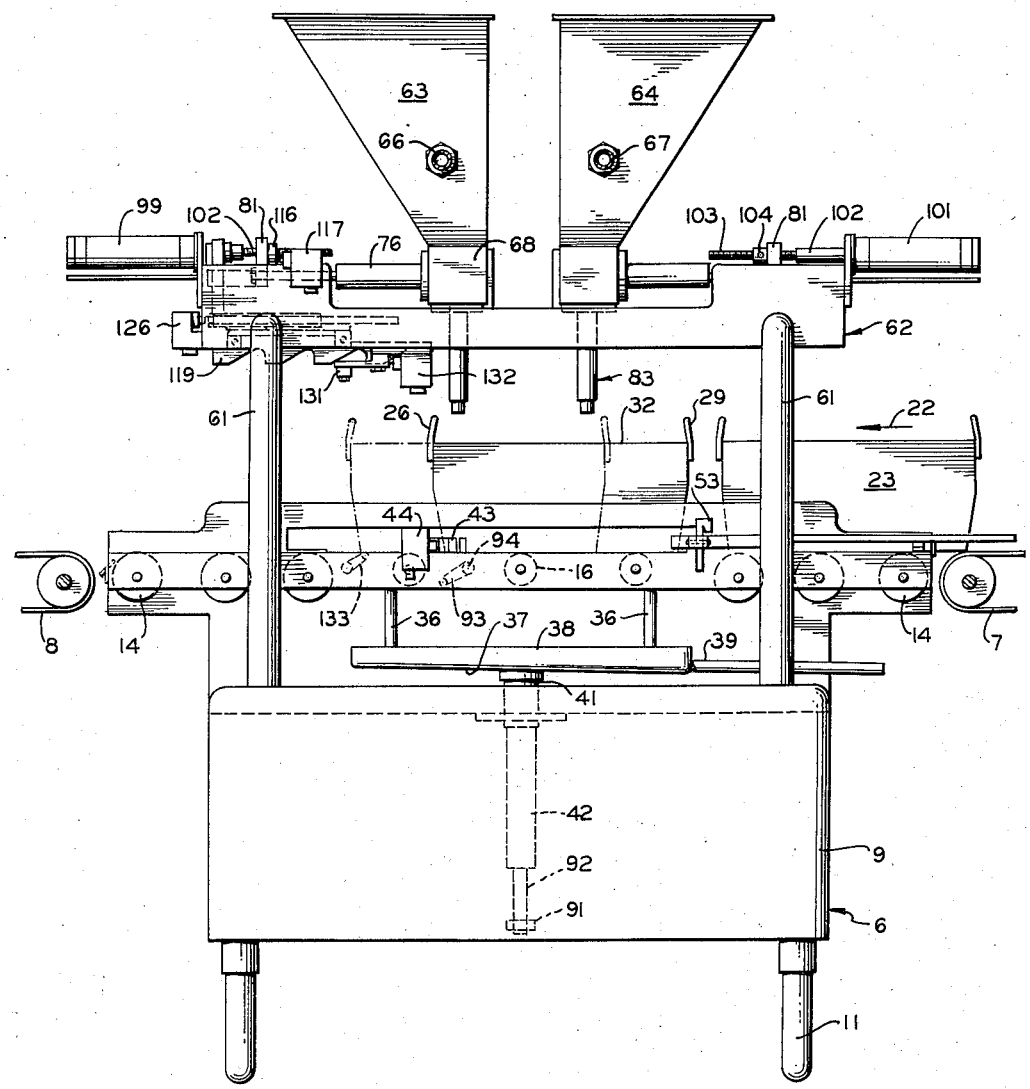
FIG_1
INVENTOR.
MARLIN B. RASMUSSON
BY Lothrop & West
ATTORNEYS

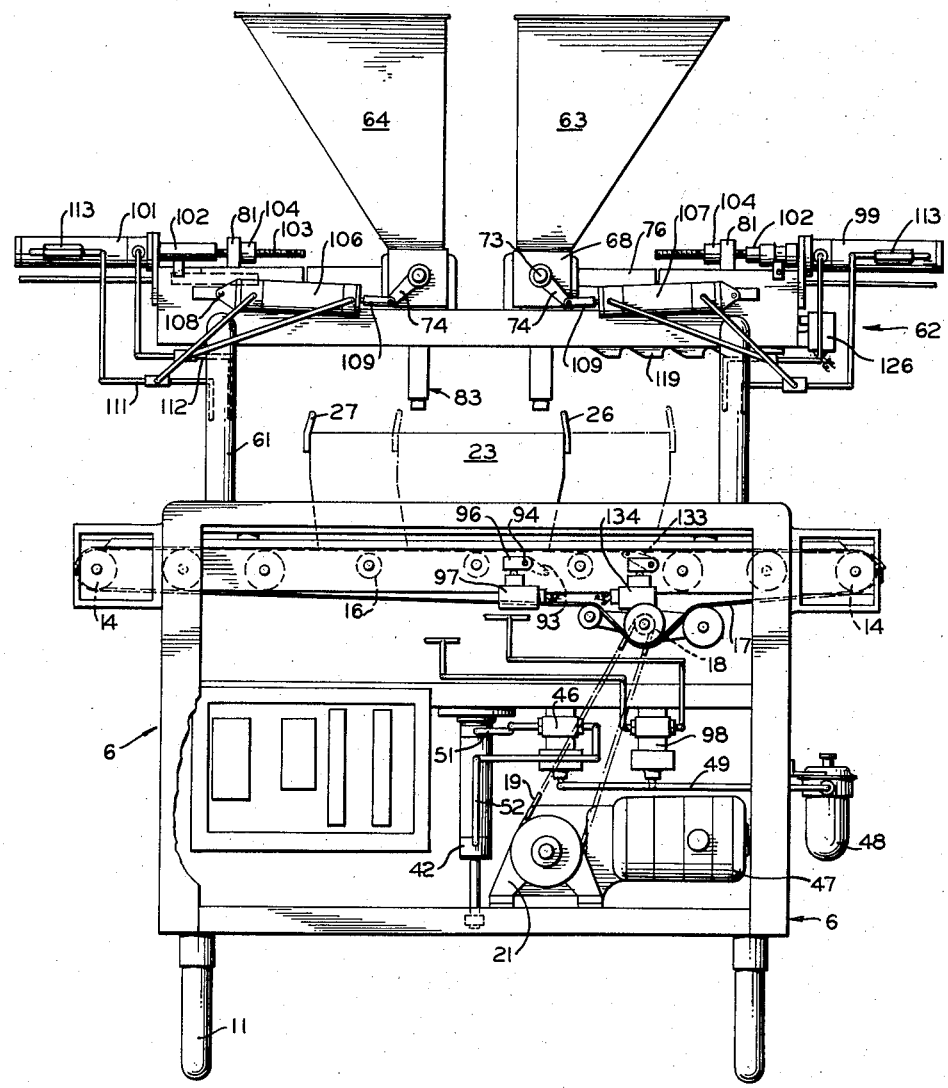

Sept. 2, 1958 M. B. RASMUSSON 2,850,051
AUTOMATIC FILLER FOR CONFECTION MOLDS
Filed Oct. 17, 1955 4 Sheets-Sheet 3
FIG_3
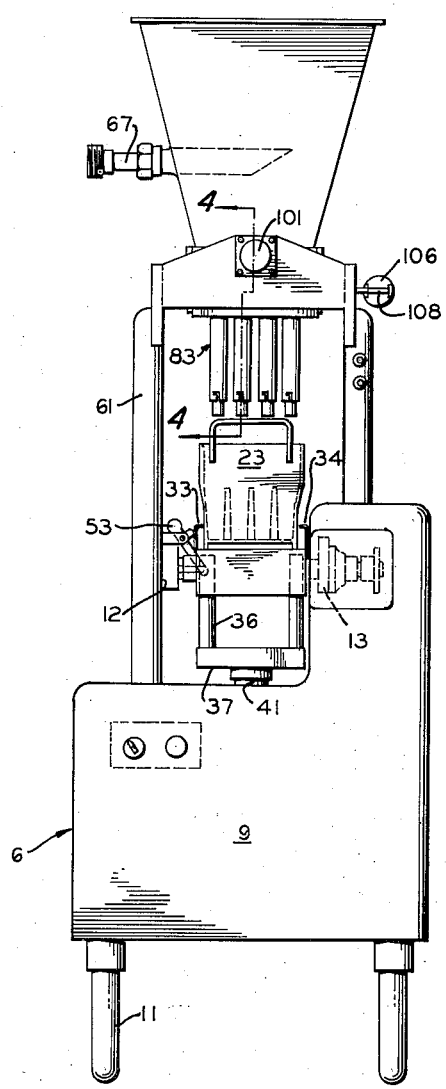
FIG_5
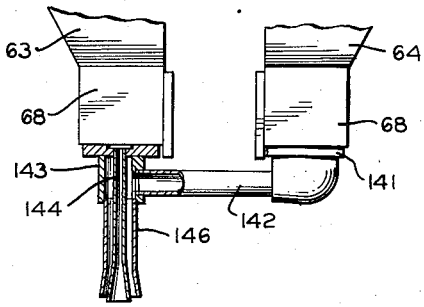
FIG_4
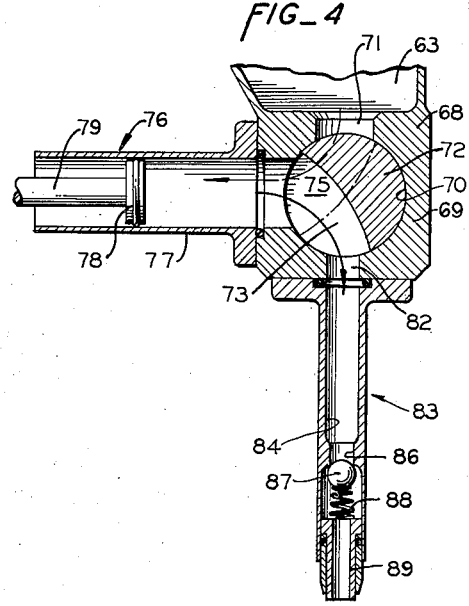
INVENTOR.
MARLIN B. RASMUSSON
BY Lothrop & West
ATTORNEYS Sept. 2, 1958
M. B. RASMUSSON
2,850,051
AUTOMATIC FILLER FOR CONFECTION MOLDS
Filed Oct. 17, 1955
4 Sheets-Sheet 4
FIG_6
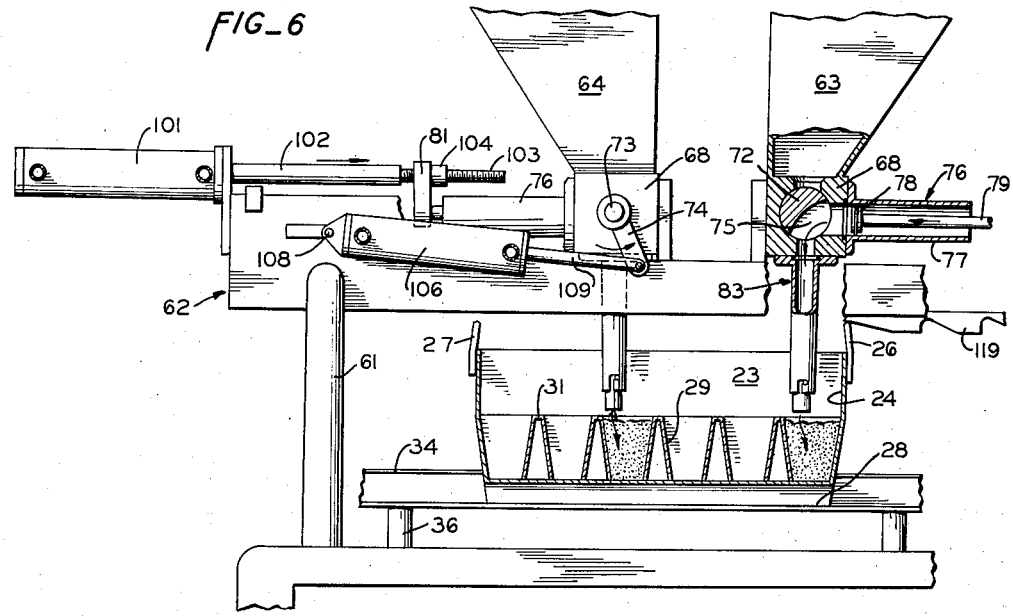
FIG_7
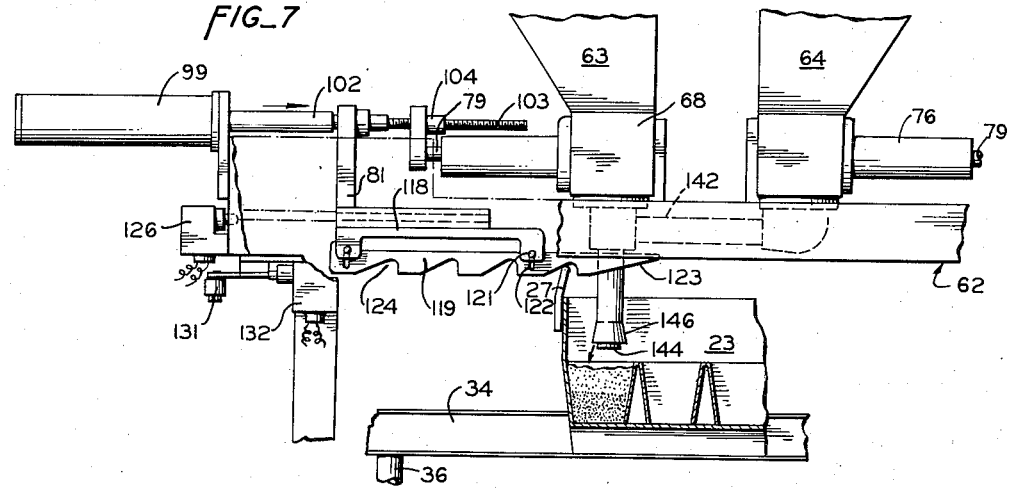
INVENTOR.
MARLIN B. RASMUSSON
BY
*Lothrop & West*
ATTORNEYS United States Patent Office 2,850,051
Patented Sept. 2, 1958

2,850,051

AUTOMATIC FILLER FOR CONFECTION MOLDS

Marlin B. Rasmusson, Sacramento, Calif.

Application October 17, 1955, Serial No. 541,014

9 Claims. (Cl. 141—160)

My invention relates generally to mechanisms for dispensing unit quantities of fluid materials into molds for subsequent handling and is especially concerned with an automatic device for use in measuring out simultaneously a plurality of individual quantities of confection, such as ice cream or water ice mix, into molds in which the confection is subsequently frozen, usually around a holding stick.

It is an object of my invention to provide an automatic filler for confection molds which functions automatically to receive an empty mold, to fill the sundry cavities therein with the requisite amount of confection, and then to discharge the filled mold.

Another object of my invention is to provide an automatic filler in which molds can readily be received, filled and discharged without supervision or assistance on the part of an operator.

Another object of my invention is to provide an automatic filler which readily can be integrated into a conveyor line in a confection factory.

A still further object of my invention is to provide an automatic filler for confection molds that is sanitary and can readily be maintained in a sanitary condition.

A still further object of my invention is to provide an automatic filler in which the amount of confection dispensed can be varied.

Another object of my invention is to provide an automatic filler in which one flavor of confection or more than one flavor of confection can alternatively be dispensed.

Another object of my invention is, in general, to provide an improved automatic filler for confection molds.

Other objects, together with the foregoing, are set forth in the form of the invention described in the accompanying description and illustrated in the accompanying drawings, in which Figure 1 is a front elevation of an automatic filler for confection molds as it has been incorporated for actual use, some molds being shown in position and some portions of the filler being broken away to reduce the extent of the figure.

Figure 2 is a rear elevation of the structure shown in Figure 1, certain parts being removed to disclose the interior construction and other parts being omitted for clarity of disclosure.

Figure 3 is an end elevation of the structure shown in Figures 1 and 2, certain parts being omitted for added clarity of disclosure.

Figure 4 is a cross section showing in detail the construction of part of the dispenser and pump device with a filling spout, the showing being in section, the planes of which are indicated by the lines of Figure 3.

Figure 5 is a side elevation of a part of a multiple flavor attachment showing the nozzle portion thereof in cross section on a diametrical plane.

Figure 6 is a side elevation, to an enlarged scale, somewhat similar to Figure 2, illustrating a single flavor mold filling operation with the mold and certain adjacent parts in cross section.

Figure 7 is a view similar to Figure 6 from the opposite side of the device and showing the multiple flavor dispensing attachment in use with parts of the mold in cross section and other parts of the device broken away.

While the automatic filler for confection molds in accordance with my invention can be adapted to numerous different environments and can have variations of construction and mode of operation without departing from the main features of the invention, it has successfully been incorporated in commercial use in the form illustrated.

In this structure there is provided a frame 6 designed to be installed in a conveyor line having a feeding conveyor 7 and a removing conveyor 8 as customary in the usual confection manufactory. The frame 6 includes an enclosed cabinet base 9 mounted on legs 11 of variable length to suit the particular floor on which the mechanism is installed. Included in the frame 6 are upstanding side members 12 and 13 between which are suitably mounted a plurality of large propulsion rollers 14 and also a plurality of small propulsion rollers 16. These are all substantially tangent to a common horizontal plane coincident with the upper plane of the conveyors 7 and 8 and all driven in an appropriate direction by a chain 17 extending around a drive pulley 18. This, in turn, is suitably rotated by a connection 19 to a motor and gear reducer combination 21 disposed on the frame 6 within the cabinet 9 and appropriately supplied with electric power. The various rollers 14 and 16 are driven in the same direction of rotation with a superficial speed approximately that of the conveyors 7 and 8 so that they can frictionally engage and advance in the direction of the arrow 22 (Fig. 1) successive ones of substantially standard confection molds 23.

While the confection molds utilized from time to time vary somewhat in configuration, they are typified by the mold illustrated in the drawings. This includes an upper confining wall 24 of quadrangular plan having a pair of looped handles 26 and 27 upstanding therefrom. The lower portion of the mold terminates in a bottom plane 28. Between the top and bottom of the mold, there is provided a plurality of pockets or cavities 29. In the present instance, there are twenty-four cavities. These are all identical and are arranged in transverse rows of four each and longitudinal files of six each. The upper surface 31 of the various pockets is substantially planar and is depressed a substantial distance below the top margin of the wall 24. The mold is customarily made of metal which will stand sterilization and constitutes a good heat transfer agent. A leading mold 32 traversing the feeding conveyor 7 in advance of a trailing mold 23 rides onto the rollers 14 and 16 and is advanced substantially into the position shown in Figure 1 with the trailing mold 23 in the position therein shown.

In the position of the leading mold 32, as seen in Figure 1, the mold has been advanced by the initial rollers 14 and 16 in the direction of the arrow 22 and has been laterally guided between a pair of channels 33 and 34 spaced apart substantially the width of the mold and at their top flanges lightly engaging the sides thereof. The channels 33 and 34 extend downwardly and also have bottom flanges under the lower plane 28 of the mold but have adequate clearance from the various adjacent rollers. These guide channels 33 and 34 are secured together transversely between successive rollers and are also connected by upright posts 36 with a connecting plate 37. With the posts 36 and the channels 33 and 34 the plate 37 serves as part of an elevator mechanism. The plate 37 also is provided with confining sides 38 and is slightly inclined to act as a drain pan having a drain pipe 39 leading away from the cabinet 9. The plate 37 is secured on a piston rod 41 extending into a pneumatically actuated cylinder mechanism 42 suitably mounted in the frame 6. When the cylinder 42 is supplied with air under pressure, the plate 37 and the rest of the elevator structure including the channels 33 and 34 are raised and lowered. Since the leading mold 32 is suported by the bottom flanges of the channels 33 and 34 the leading mold is likewise raised and lowered with the elevator.

As the leading mold 32 is advanced over the channels 33 and 34, being laterally guided into an accurate location by the upper flanges of those channels, the leading corner of the mold strikes a stop and actuating lever 43 pivoted on the frame 6 in such a fashion that when it is encountered by the mold 32 arriving at the proper station, a connected switch 44 is thereby actuated. The switch 44 is in an electrical circuit (not shown) controlling an electromagnetic valve 46 mounted in the frame 6 and governing flow from an air compressor 47 driven by the motor 21. Air taken from the atmosphere by the motor driven compressor 47 is sent through a suitable filter 48 and moisture removing device into a pneumatic circuit represented by a tube 49. For clarity, all parts of the pneumatic tubing are not illustrated but the source and end point of each branch are defined. The tube 49 leads to the electro-magnetic valve 46. This valve has two positions and is connected by suitable tubing 51 and 52 to the opposite ends of the pneumatic cylinder 42. The electric switch 44 assists in controlling the two positions of the valve 46 and in producing corresponding alternate positions of the piston rod 41 within the cylinder.

When the switch 44 is actuated by the abutment of the leading mold 32, the valve 46 is positioned to deliver air to the lower portion of the cylinder 42. This raises the piston rod 41 and, consequently, lifts the mold 32. The forward advance of the mold is arrested by the switch lever 43 despite the fact that the roller 16 continues to revolve frictionally against the bottom of the mold until such time as this engagement is broken by lifting of the channels 33 and 34. The mold is still longitudinally arrested by the switch lever 43 so that its forward position in its station is accurately maintained until the effect of the driving rollers 16 is overcome. As the elevator rises, a device is made effective to arrest the further advance of the succeeding mold 23 on the initial rollers 14.

Weighted to fall into the path of the mold 23 is a pivoted lever 53 held out of the path of the mold by the channel 33 when the elevator is in its lower position. As the elevator rises, however, the lever 53 falls horizontally into the path of the succeeding mold 23 and holds it against the frictional impetus of the rollers 14 until later in the operation. But one load at a time, therefore, gets into ascending position on the elevator for lifting.

The purpose of lifting the mold on the elevator is to present the mold for filling the various cavities 29 therein. In the present device, the frame 6 is continued upwardly by posts 61 holding a superstructure 62 in position. The superstructure is considered as part of the general framework 6 but is located generally above the path of the molds 23. Secured on the superstructure are two substantially identical confection dispensing devices. The description applicable to one is applicable to the other with the exception of certain features, particularly noted. The dispensing devices include separate hoppers 63 and 64 preferably of stainless material adapted to receive a confection through connections 66 and 67. Initially, it is considered that the identical confection is supplied through the connections 66 and 67.

At the base of each of the hoppers 63 and 64 is a valving structure 68. As especially illustrated in Figure 4, the valving structure includes a block 69 having a circular cylindrical cross bore 70 therein with which a plurality of apertures 71 communicate. In the present instance, since there are four pockets or cavities 29 in a transverse direction, there are four apertures 71 each leading into the cross bore 70. Within the cross bore there is rotatably disposed a cylindrical valve plug 72 emerging at one end in a shaft 73 having a lever 74 thereon so that the valve plug 72 can be rotated or operated within the block 69. The valve plug 72 has four substantially diametrical slots 75 formed therein to register with the apertures 71 in one position of the valve illustrated by the dotted lines in Figure 4. In the other position of the valve, illustrated by the solid lines in Figure 4, the valve plug 72 cuts off communication with the apertures 71. The valve plug thus controls the release of confection from the hopper.

Secured to one side of the block 69 is a multi-cylinder pump 76. This is a reciprocating measuring pump and includes a plurality of cylinder barrels 77 within which a plurality of piston 78 are reciprocable. The barrels 77 are lined up with the apertures 71 and have individual communication through the individual slots 75 with their respective apertures. The pistons 78 are connected to individual piston rods 79 extending from the cylinder barrels 77 and joined to a cross head 81 which is mounted for reciprocation on the superstructure 62 so that when the cross head 81 is moved to and fro, the individual pistons 78 recede and advance in unison.

On the receding stroke, the valve is in an appropriate position so that the pump bars 77 are simultaneously filled with confection from the hopper, the length of stroke of the pistons 78 determining the volume of confection withdrawn. As the pistons 78 reverse their motion and travel into the cylinder barrels, the valve plug 72 likewise changes position so that the previously measured and confined confection is then expelled under pressure through a plurality of ports 82 in the lower part of the block 69 and then into corresponding, individual, depending nozzles 83 secured to the block.

Each of the nozzles includes a depending tube 84 formed to provide a seat 86 for a check valve 87. The valve is normally urged into closed position by a spring 88 bearing against a removable nozzle tip 89 preferably fastened into the tube 84 by means of a bayonet connection so that the nozzle tip 89 and the spring 88 and the valve 87 can all readily be removed, either for cleaning or for the substitution of different kinds of nozzles. Also, the proportions of the nozzles vary somewhat with the material being handled. When the valve 87 is a relatively great distance from the nozzle tip, as shown, the structure is appropriate for handling quite thick or viscous material. With thinner materials, the nozzle design is changed so that the ball valve 87 is very close to the nozzle outlet in order to avoid after-dripping.

The two hoppers 63 and 64 and their attendant mechanism including the various nozzles 83 are preferably disposed so that the nozzles for the hopper 63 are immediately above the leading pocket presented by the mold 32 as it is lifted by the elevator, whereas the nozzles attached to the hopper 64 are immediately above the cavities or pockets 29 constituting the fourth row in the mold being presented. Since it is desired under most circumstances to operate the two feeding or dispensing mechanisms simultaneously, the first and fourth rows of the mold are simultaneously charged.

To accomplish this, the elevator rises to a predetermined height. This height is regulated by a stop collar 91 at the bottom of an extension 92 of the piston rod 41. The collar is adjustable vertically on the extension 92 and abuts the bottom of the cylinder 42 to arrest the upward movement of the elevator and the mold thereon in exactly the right vertical position immediately below the various nozzles.

During the ascent of the elevator and before the piston rod 41 has completed its lifting movement, the elevator in leaving its lowermost position, as shown in Figure 11, rises from the free end of a lever 93 spanning the frame 6 of the device between various of the rollers 16 and normally held depressed by the elevator structure in its lower position. The lever 93 is on a cross shaft 94 projecting (Figure 2) to be connected to a lever 96 in position to actuate an electro-pneumatic switch 97. This switch controls the operation of an electro-pneumatic valve 98 having two positions corresponding to the two positions of the switch 97.

When the lever 93 is down, as shown in Figure 1, in the lower position of the elevator, the position of the valve 98 is such that no air is supplied to the superstructure. When, however, the elevator begins to lift, the lever 93 is released and the lever 96 drops to actuate the switch 97 so that the valve 98 takes up its other position and supplies air to the superstructure. This air is utilized in two substantially identical actuating or driving devices, a description of one, therefore, being applicable to the other, except where noted. Air under pressure and under control of the switch 98 is led in suitable passages through the hollow posts 61 and from each of them extends by suitable connections to drive cylinders 99 and 101 appropriately mounted on the superstructure 62.

The drive cylinder 99 is connected by a piston rod 102 to the cross head 81 for one of the pumps whereas the cylinder 101 is connected by an identical piston rod 102 to the corresponding cross head 81 for the other pump. Preferably, the stroke of the piston rods 102 within the cylinders 101 is made a little bit longer than, or at least as long as, the maximum stroke required by the pump plungers 78. Usually, something less than the full stroke is utilized so that each of the piston rods 102 is not directly connected to its cross head 81. Rather, it is provided with a reduced extension 103 threaded to receive an adjusting strap 104 which can be variably positioned. As the cylinders 99 and 101 are energized to expel their piston rods 102, there is usually, depending upon the adjustment, some lost motion before the enlarged part of the piston rod abuts the cross head 81 and produces corresponding motion of the pump metering plungers 78. On the reverse motion, during the retraction of the piston rod 102 into the cylinders 99 and 101, the lost motion is first taken up and the pump plungers 78 are not retracted until the adjusting stops 104 abut the cross heads 81 and restore them finally to their originally adjusted locations. Thus, when the cylinders 99 and 101 are appropriately supplied with air, they reciprocate in a fashion to actuate the dispensing plungers 78 correspondingly.

Also supplied with air by the actuation of the valve 98 are valve actuating cylinders 106 and 107 which are substantially identical so that the description of one applies equally to the other except where noted. The cylinders 106 and 107 are appropriately mounted on the superstructure 62 by pivot mountings 108 so that the cylinders can oscillate. The piston rods 109 of the cylinders 106 and 107 are individually connected to the lower ends of the levers 74 extending from the valves in the individual hoppers 63 and 64. When the cylinders 106 and 107 are supplied with air at one end, they operate the valves 72 into one extreme position and when the cylinders 106 and 107 are supplied with air at the other end, they operate the valves 72 into the other extreme position.

Since air from the valve 98 is alternately directed to opposite ends of the cylinders 99 and 101 as well as the cylinders 106 and 107 and since the supply of air goes to the corresponding ends of all of these cylinders substantially simultaneously, but since it is desired to have the valve bodies 72 change positions rather abruptly and before any substantial actuation of the pump plungers 78 occurs, there are disposed in the various pneumatic lines 111 and 112 between the valve 98 and the various cylinders appropriate flow limiting valves 113. These insure that the cylinders 106 and 107 are actuated just before or simultaneously with the actuation of the cylinders 99 and 101.

The time it takes the cylinder 42 to lift the elevator into its uppermost position is substantially the same as the time it takes for the cylinders on the superstructure frame 62 to work so that at about the time the cavities in the mold 32 are presented to the nozzles, substantially as shown in Figure 6, there is then a measured discharge from the hoppers into the molds. That measured discharge occurs as the piston rods 102 accomplish their projecting movement from the cylinders 99 and 101. So that this movement can be reversed when it has been appropriately accomplished, there is provided on one of the cross heads 81 an adjustable abutment 116 in a position to operate a switch 117 on the super-structure 62 just as the cross head stroke is completed. The switch 117 is in circuit with the electro-pneumatic valve 98 so that the valve position is reversed. The pneumatic flow is likewise reversed and the cylinders 99 and 101 begin a retraction of the piston rods 102 simultaneously with or just after the cylinders 107 and 106 have reversed the valve plugs 72 so that during the retracting stroke of the piston rods 102, the next measured charge of confection is drawn into the pump barrels 77.

Means are provided for advancing the presented mold 32 on and with respect to the elevator in time with the cyclic operation of the dispensing mechanism, the advance being one step for each cycle of operation of that mechanism. For this purpose the cross head 81 associated with the cylinder 99 is provided with a sub-frame 118 from which depends a ratchet bar 119. This bar is confined against longitudinal translation with respect to the sub-frame 118 by pins 121 operating in vertical slots 122 in the ratchet bar. The slots 122 permit independent vertical movement of the ratchet bar 119 to a limited extent at its opposite ends. This bar is provided with a tapered leading portion 123 serving as a cam adapted to ride over the leading handle 27 on the mold. Following the leading portion 123, the ratchet bar 119 is provided with similar inclined portions defining four successive notches 124. These are formed with relatively steep trailing surfaces so as to engage behind the handle 27.

As the mold is initially presented to the nozzles and as the cross head 81 makes its initial advancing movement, the location of the sub-frame 118 and of the ratchet bar 119 is such that the surface 123 cams over the handle 27. The ratchet bar lifts slightly for that purpose and then falls back by gravity with the leading notch 124 in engagement with the handle 27. Thus, when the cylinder 99 is energized to retract the cross head 81 after its first excursion, the corresponding movement of the ratchet bar 119 in engagement with the handle 27 frictionally advances the mold one step on the lifted elevator. This continues until the second row of cavities is disposed immediately beneath the nozzles associated with the hopper 63 and the fifth row of cavities is disposed immediately beneath the nozzles associated with the hoppers 64. In this fashion, the molds advance one step for each complete reciprocation of the dispensing mechanism.

As the dispensing mechanism returns to its initial position, the cross head 81 in achieving such initial position abuts against a switch 126 mounted on the superstructure 62, connected in circuit with the switch 97 and effective upon the electro-pneumatic valve 98 to cause a reversal. Thus, the cross head 81, at the conclusion of its first complete excursion, is then conditioned to make a second substantially identical excursion. The events repeat themselves so that the succeeding cavities are similarly filled.

During the second return motion of the dispensing mechanism, the next successive notch 124 engages the handle 27 and advances the mold to its next successive cyclic position with the third row of cavities in registry with the nozzles associated with the hopper 63 and with the sixth or last row of cavities in registry with the nozzles associated with the cavities 64. The third successive, dual filling operation transpires. As the leading mold is finally advanced by the ratchet bar 119 into an advanced location, mechanism is set in order for stopping the dispensing cycle.

The mold 32 in its advanced position at the conclusion of the third dispensing cycle is brought into a location to move a lever 131 controlling a switch 132. This switch is in circuit with the starting switch 44 and actuates the electro-pneumatic valve 46 so that the connections to the cylinder 42 are reversed and the filled mold 32 is lowered by virtue of the lowering of the elevator. The mold, of course, lowers in a position advanced with respect to its initial position and descends approximately as shown by the dotted lines in Figures 1 and 2.

As the elevator completes its descent, the mold comes again into contact with the rollers 16 and 14 and is then impelled by them to be withdrawn from the machine and directed toward the conveyor 8 for further handling. If by any chance, the way of egress is blocked, for example by a preceding dislodged mold, the filling machine cannot be recycled. That is for the reason that a switch arm 133 in the path of the descending filled mold controls a switch 134 effective to neutralize all of the other electric circuits in the structure. Until the filled mold has thus been advanced from the descended elevator and has been taken out of the way, the machine cannot recycle. Normally, however, the filled mold leaves the elevator promptly and the machine is ready to accept the next succeeding mold being advanced from the conveyor 7. To accept the next succeeding mold, the stop 53 is moved out of the way during the final descending movement of the elevator which overcomes the unbalance of the lever, keeping it in the path of the advancing mold and, by camming against the lever, moves it out of the mold path.

The described operation is therefore effective to receive an empty mold, to place it in an initial position, to lift the mold and thus to present it to a duplex dispensing mechanism which measures out and expels a selected confection, to advance the mold so that the various pockets therein are filled in pairs of rows automatically, then to lower the mold out of presenting position and to remove it from the machine with adequate electrical interlocks so that there is an appropriate sequence of operation. The amount of material dispensed is variable by an appropriate setting and the precise positioning of the parts can be varied by shifting sundry of the stops and other locating devices. The operation is relatively smooth because of the operation of the pneumatic devices, yet the cycle is quick because of the utilization of electrical controls.

In some instances, it is not desired to fill a number of the rows simultaneously but rather to utilize the versatility of the machine for supplying different sorts of confections to the molds so that each mold finally contains different kinds of confections, for example, different flavors of ice cream. For that reason, the device is somewhat modified by mechanism shown particularly in Figures 5 and 7. The machine remains generally unaltered with two major exceptions. The nozzles such as 83 (Figure 4) are all detached from the respective nozzle blocks 68 and are replaced with a duplex nozzle arrangement as shown in Figure 5. This comprises a nozzle plate 141 held in operating relationship with the nozzle block 68 associated with the hopper 64 which leads not directly into a nozzle but rather into a plurality of cross pipes 142 joined through the outside of a manifold 143 secured to the block 68 pertinent to the hopper 63. From the block 68 itself there depend interior nozzle tubes 144 concentric with exterior nozzle tubes 147 communicating with the individual cross pipes 142. There are thus provided, four abreast, duplex concentric nozzles immediately below the hopper 63. The different sorts of confection are dispensed concentrically from the concentric nozzles. In this instance, check valves are not shown although they can be employed as in the case of the Figure 4 construction.

In addition to changing the nozzles, another change is the repositioning of the lever 131 and the switch 132 from the position on the superstructure 62 shown in Figure 1 into a more advanced position as shown in Figure 7. Therein, the lever 131 is not abutted by the advancing mold at the end of the third cycle of advance but, rather, is abutted at the sixth cycle of advance. That is for the reason that the duplex nozzles 146 must be positioned over each row of six rows of the molds. The ratchet bar 119 has adequate notches (including the left-hand surface) to advance the mold five increments, thus moving the mold successively from its initial position into its final position on the elevator. The function of the switch 132 is identical with the previously described function so that with these two simple changes; that is, the movement of the switch actuator 131 and the switch 132 and the substitution of the Figure 5 form of duplex nozzle for the Figure 4 form of simplex nozzle, the machine is readily adapted to dispense two confections into each mold cavity. This version of the machine has the various features and advantages previously mentioned and in addition, affords a desirable variation in the type of confection ultimately discharged for freezing or other handling.

What is claimed is:

1. An automatic filler for confection molds comprising a frame, a vertically reciprocable mold elevator on said frame, means for advancing a mold onto said elevator, a confection dispensing nozzle on said frame above said elevator, means for actuating said elevator to lift said mold thereon into receiving relationship to said nozzle, means on said frame for dispensing a confection from said nozzle into said lifted mold, means on said frame for laterally moving said lifted mold on said elevator into an advanced position out of receiving relationship to said nozzle, means controlled by said mold in said advanced position for actuating said elevator to lower said mold thereon, and means for withdrawing said lowered mold from said elevator.

2. An automatic filler for confection molds comprising a frame, a vertically reciprocable mold elevator, means on said frame for moving said elevator between a raised position and a lowered position, means on said frame for advancing a mold into initial position on said elevator in lowered position, means on said frame operated by a mold in said initial position for actuating said moving means to move said elevator into raised position, a confection dispensing device on said frame including a nozzle above said mold in said initial position thereof, means on said frame operated by said elevator in said raised position for actuating said device, means operated by said device for moving said mold on said elevator from said initial position into an advanced position laterally away from said nozzle, means operated by said mold in said advanced position for actuating said moving means to move said elevator into lowered position, and means on said frame for withdrawing said mold from said elevator in said lowered position.

3. An automatic filler for confection molds comprising a frame, a mold elevator, means on said frame for raising and lowering said elevator between an upper position and a lower position, means on said frame for advancing a mold into initial position on said elevator in said lower position, means on said frame actuated by a mold in said initial position for actuating said raising means to move said elevator into said upper position, a confection dispensing device on said frame and including a pump and a reciprocating pump driver adapted when actuated to discharge into said mold in said initial position thereof, means on said frame operated by said elevator in said upper position for actuating said reciprocating pump driver, means on said frame for moving said mold on said elevator from said initial position laterally into an advanced position, means operated by said reciprocating pump driver for actuating said mold moving means, means operated by said mold in said advanced position and by said reciprocating pump driver for actuating said lowering means to move said elevator into said lower position, and means on said frame for withdrawing said mold from said elevator in said lower position.

4. An automatic filler for confection molds comprising a frame, a nozzle on said frame, a pump connected to discharge confection through said nozzle, a reciprocating driver for actuating said pump, means on said frame for presenting a mold to said nozzle with said mold in an initial position axially in line with said nozzle, means operated by said reciprocating driver for moving said mold from said initial position into an advanced position with said mold laterally out of line with said nozzle, and means operated by said mold in said advanced position for withdrawing said mold in an axial direction away from said nozzle.

5. An automatic filler for confection molds comprising a frame, a nozzle on said frame, a pump on said frame connected to discharge confection through said nozzle, a cyclically operating driver for actuating said pump, means on said frame for presenting a mold in initial position with one part of said mold in line with said nozzle, means operated by said presenting means for actuating said driver through a plurality of cycles, means on said frame for moving said mold laterally of said nozzle one step for each cycle of said driver from said initial position to an advanced position with another part of said mold in line with said nozzle, means operated by said mold in said advanced position for interrupting said actuation of said driver, and means on said frame for withdrawing said mold in an axial direction away from said advanced position.

6. An automatic filler for confection molds comprising a frame, a cyclically operating confection dispenser having a nozzle, means on said frame for presenting a mold to said dispenser by a movement axially toward said nozzle when said mold is in an initial position with one portion thereof in line with said nozzle, means on said frame and operated by said dispenser once for each cycle thereof for advancing said mold from said initial position one step laterally toward an advanced position with another portion of said mold in line with said nozzle, and means on said frame operated by said dispenser and by said mold on said presenting means for withdrawing said mold from said dispenser by a movement axially away from said nozzle.

7. An automatic filler for elongated confection molds comprising a frame, a confection dispenser on said frame, means on said frame for approaching a mold to said dispenser in an initial position with one portion of said elongated mold in line with said dispenser, means on said frame for actuating said dispenser once and moving said mold one step laterally in the direction of the length of said mold, means on said frame for operating said actuating and moving means a plurality of times, and means on said frame for withdrawing said mold from said dispensing means with another portion of said elongated mold in line with said dispenser after a predetermined number of operations thereof.

8. An automatic filler for confection molds having a plurality of cavities comprising a frame, a dual confection dispenser having two series of nozzles on said frame, means on said frame for presenting a mold to said dual dispenser with a plurality of said cavities in receiving position under both series of nozzles, means for actuating both series of nozzles of said dual dispenser simultaneously to fill a plurality of said cavities, means for advancing said mold to present another plurality of said cavities in receiving position under both series of nozzles, and means for withdrawing said mold from both series of nozzles.

9. An automatic filler for confection molds having a plurality of cavities therein comprising a frame, a confection dispenser nozzle on said frame, means for advancing a mold on said frame into an initial position with one of said cavities in said mold under but away from said dispenser nozzle, means on said frame for lifting said mold into a lifted position with said one of said cavities directly beneath said dispenser nozzle, means for actuating said dispenser nozzle when said mold is in said lifted position, means for shifting said mold laterally in said lifted position once for each of a plurality of actuations of said dispenser nozzle, each of said shifts positioning a different one of said cavities directly beneath said dispensing nozzle, and means for lowering said mold from said lifted position and progressing said mold away from said dispenser nozzle.

References Cited in the file of this patent

UNITED STATES PATENTS

| | | |
|---|---|---|
| 1,460,825 | Peters | July 3, 1933 |
| 1,960,456 | Robb | May 29, 1934 |
| 2,177,375 | Parcell | Oct. 24, 1939 |
| 2,240,214 | Herdelmeyer et al. | Apr. 29, 1941 |